(12) United States Patent
Zanotto et al.

(10) Patent No.: US 9,101,017 B2
(45) Date of Patent: Aug. 4, 2015

(54) LIGHTING MODULE

(71) Applicant: OSRAM GmbH, Munich (DE)

(72) Inventors: Alberto Zanotto, Padua (IT); Lorenzo Roberto Trevisanello, Abano Terme (IT); Alberto Alfier, Vedelago (IT); Franco Zanon, Cassola (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/372,220

(22) PCT Filed: Jan. 15, 2013

(86) PCT No.: PCT/EP2013/050650
§ 371 (c)(1),
(2) Date: Jul. 15, 2014

(87) PCT Pub. No.: WO2013/107729
PCT Pub. Date: Jul. 25, 2013

(65) Prior Publication Data
US 2014/0339994 A1 Nov. 20, 2014

(30) Foreign Application Priority Data
Jan. 16, 2012 (IT) .............. TO2012A0028

(51) Int. Cl.
*H05B 33/08* (2006.01)
*F21S 4/00* (2006.01)
(Continued)

(52) U.S. Cl.
CPC ............ *H05B 33/0815* (2013.01); *F21S 4/003* (2013.01); *H05B 33/083* (2013.01); *H05B 33/0803* (2013.01); *H05B 33/0812* (2013.01); *F21Y 2101/02* (2013.01); *F21Y 2103/003* (2013.01)

(58) Field of Classification Search
None
See application file for complete search history.

(56) References Cited

U.S. PATENT DOCUMENTS 4,882,522 A * 11/1989 Brown ................. 315/119
7,012,379 B1   3/2006 Chambers et al.
(Continued)

FOREIGN PATENT DOCUMENTS

WO    2007013003 A1    2/2007
WO    2009069062 A1    6/2009
(Continued)

OTHER PUBLICATIONS

International Search Report issued in PCT/EP2013/050650 dated May 31, 2013.
(Continued)

*Primary Examiner* — Crystal L Hammond

(57) ABSTRACT

A lighting module includes a power line for receiving a power supply current and a ground line, a segmentation point for cutting the lighting module into two parts, a first set of light sources upstream of the segmentation point, a second set of light sources downstream of the segmentation point, wherein the first and second sets of light sources are connected in series, and a resistive element connected to the intermediate point between the first and the second set of light sources, and the ground line, which is configured in such a way that: when the lighting module has not been cut, the resistive element has a resistance which is greater than the resistance of the portion of the lighting module downstream of the segmentation point, and when the lighting module has been cut, the resistive element has a resistance which is less than the resistance thereof.

10 Claims, 6 Drawing Sheets

(51) Int. Cl.
*F21Y 101/02* (2006.01)
*F21Y 103/00* (2006.01)

(56) References Cited

U.S. PATENT DOCUMENTS

| | | | |
|---|---|---|---|
| 7,750,576 B2* | 7/2010 | Pan et al. | 315/185 R |
| 2002/0117975 A1* | 8/2002 | Yang | 315/291 |
| 2004/0095079 A1* | 5/2004 | Matsumoto | 315/291 |
| 2005/0168173 A1* | 8/2005 | Kato | 315/291 |
| 2008/0315777 A1* | 12/2008 | Ruxton | 315/193 |
| 2009/0091265 A1* | 4/2009 | Song et al. | 315/185 R |
| 2010/0019687 A1* | 1/2010 | Komiya et al. | 315/291 |
| 2010/0164409 A1 | 7/2010 | Lo et al. | |
| 2012/0044689 A1 | 2/2012 | Kraus et al. | |

FOREIGN PATENT DOCUMENTS

| | | |
|---|---|---|
| WO | 2010089229 A1 | 8/2010 |
| WO | 2010145879 A1 | 12/2010 |

OTHER PUBLICATIONS

Rapporto di Ricerca issued in IT TO20120028 dated Aug. 22, 2012.

* cited by examiner

LIGHTING MODULE

RELATED APPLICATIONS

The present application is a national stage entry according to 35 U.S.C. §371 of PCT application No.: PCT/EP2013/050650 filed on Jan. 15, 2013, which claims priority from Italian application No.: TO2012A000028 filed on Jan. 16, 2012, and is incorporated herein by reference in its entirety.

TECHNICAL FIELD

Various embodiments relate to lighting modules. The description has been drawn up with particular care for the purpose of providing linear LED modules including a plurality of light emitting diodes (LEDs) connected in series.

BACKGROUND

FIG. 1 shows an example of a lighting module 20 comprising a plurality of light sources. For example, in what are known as linear LED modules, a plurality of LEDs L is connected in series. These linear LED modules are used, for example, for "cove lighting", for shelf lighting, or in general for all applications in which long narrow lighting modules can be used. Typically, these lighting modules 20 are mounted on a printed circuit board (PCB), such as an FR4 printed circuit or a flexible printed circuit.

As a general rule, a linear lighting module 20 comprises at least two contacts 202a and 202b for receiving a power signal. A lighting module 20 of this type often comprises two further contacts 204a and 204b which can be used to connect a plurality of lighting modules in series. Additionally, the contacts 204a and 204b of the last lighting module of the string are typically short-circuited by a link or resistor to close the current loop. Therefore, the possible length of the string of lighting modules that can be provided depends substantially on the length of the individual lighting modules.

As a general rule, short modules can be used to create any desired length, whereas long modules reduce the number of connections between the lighting modules.

For this reason, lighting modules have been developed which can be cut to different lengths, for example by cutting the module at certain predetermined segmentation points. For example, FIG. 1 shows three segmentation points 200a, 200b and 200c. For example, FIGS. 2A to 2C show examples in which the lighting module of FIG. 1 has been cut, respectively, at the segmentation point 200c, 200b and 200a.

However, as mentioned previously, a link or a resistor must be connected, by soldering for example, to the lighting module 20 in order to close the current loop. For example, other contacts have to be provided for this reason on the printed circuit, and this operation is particularly difficult and/or may damage the lighting module 20.

SUMMARY

The object of the disclosure is to overcome the drawbacks described above.

In various embodiments, the lighting module includes a segmentation point for cutting the lighting module into two parts. The lighting module therefore includes a first set of light sources upstream of the segmentation point, and a second set of light sources downstream of the segmentation point, wherein the first and second sets of light sources are connected in series.

In various embodiments, the lighting module further includes a resistive element connected to the intermediate point between the first and the second set of light sources, and the ground. This resistive element allows the current to flow when the lighting module has been cut; in other words, a) when the lighting module has not been cut, the resistive element causes the power supply current to flow mainly through the light sources, and b) when the lighting module has not been cut, the resistive element causes the power supply current to flow mainly through the light sources upstream of the interruption and through the resistive element.

In various embodiments, in order to provide this operation, the resistive element is configured in such a way that:

a) when the lighting module has not been cut at the segmentation point, the resistive element has a resistance which is greater than the resistance of the portion of the lighting module downstream of the segmentation point, and b) when the lighting module has been cut at the segmentation point, the resistive element has a resistance which is less than the resistance of the portion of the lighting module downstream of said segmentation point.

For example, in various embodiments, the resistive element is a resistor which has a resistance greater than the resistance of the portion of the lighting module downstream of the segmentation point.

In other embodiments, the resistive element is an element having an adjustable resistance, such as an electronic switch. For example, in various embodiments, the electronic switch is associated with detection means which detect whether the lighting module has been cut at the segmentation point, and which drive the switch in a suitable way.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced. The following description illustrates various specific details intended to provide a deeper understanding of the embodiments.

The embodiments can be provided without one or more of the specific details, or with other methods, components, materials, etc. In other cases, known structures, materials or operations are not shown or described in detail, in order to avoid obscuring various aspects of the embodiments.

The reference to "an embodiment" in this description is intended to indicate that a particular configuration, structure or characteristic described in relation to the embodiment is included in at least one embodiment. Therefore, phrases such as "in an embodiment", which may be present in various parts of this description, do not necessarily refer to the same embodiment. Furthermore, specific formations, structures or characteristics may be combined in a suitable way in one or more embodiments.

The references used herein are provided purely for convenience and therefore do not define the scope of protection or the extent of the embodiments.

As mentioned above, the present description provides solutions which can be used to provide lighting modules having various lengths.

Figure 1:
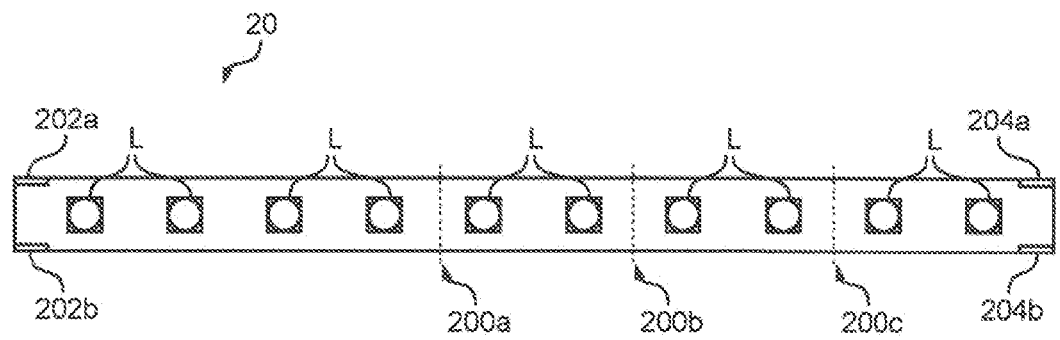
FIGS. 1 and 2A to 2C have already been described.
Figure 2A:
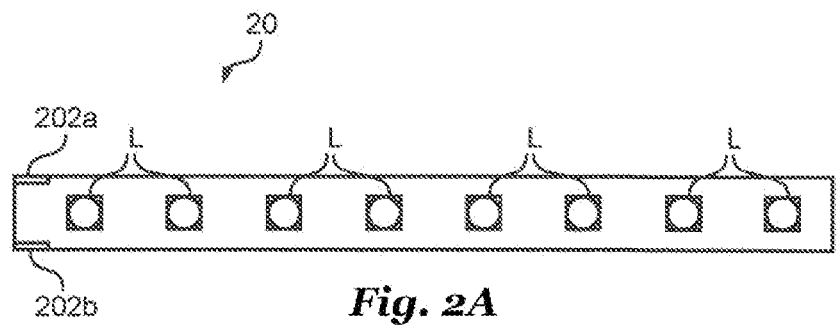
Figure 2B:
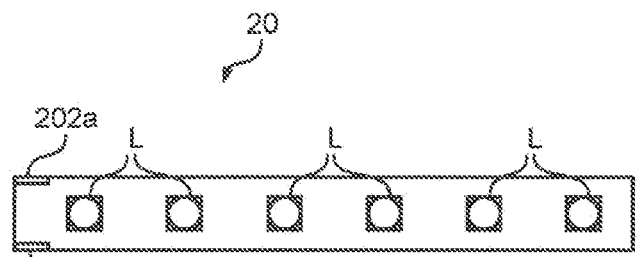
Figure 2C:
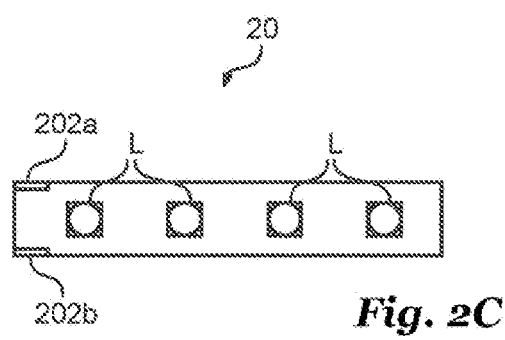
Figure 3A:
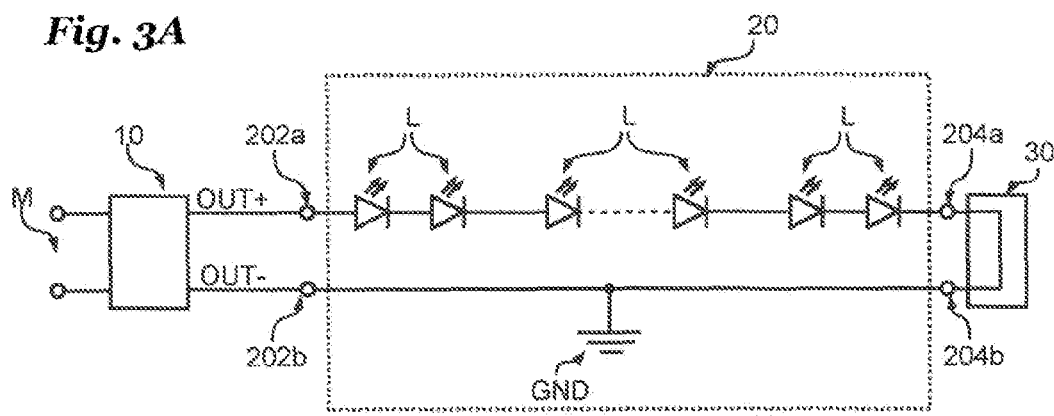
FIGS. 3A and 3B show examples of lighting modules.
Figure 3B:
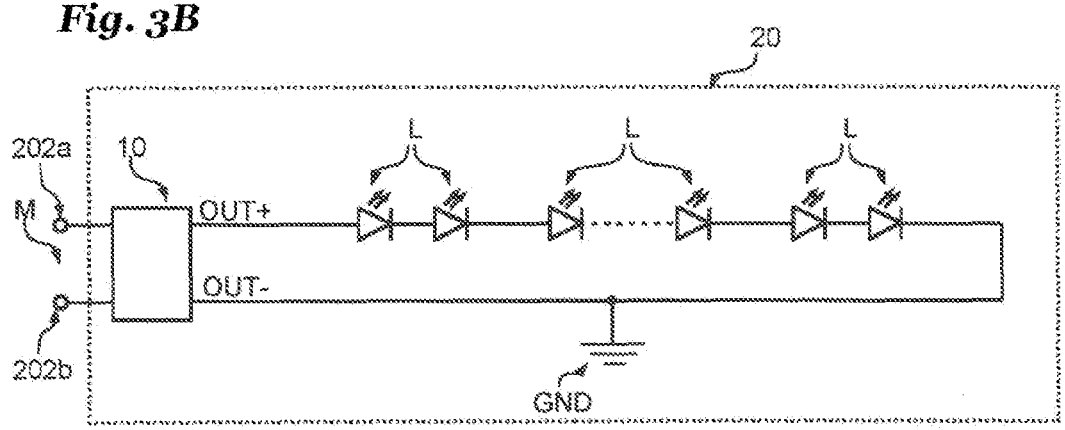

FIGS. 3A and 3B show two typical lighting systems which comprise an electronic converter 10 and a lighting module 20 comprising a plurality of light sources, such as LEDs L, connected in series. In various embodiments, the electronic converter 10, which may be, for example, a linear or switching power supply (AC/DC or DC/DC), receives a power signal M (from the electrical supply line, for example) at its input and supplies a direct current at its output via a power output comprising two terminals, OUT+ and OUT−. This current can be constant or can vary over time for the purpose of controlling the light intensity emitted by the LED, in what is known as a "dimming" function. As a general rule, the light intensity can be regulated by regulating the mean current flowing through the lighting module, for example by setting a lower direct current and/or by modulating the current, for example, by pulse width modulation (PWM).

In the embodiment shown in FIG. 3A, the lighting module 20 comprises two connectors 202 and 204.

In particular, in the embodiment under consideration, the first connector 202 and the second connector 204 each comprise at least two contacts, indicated, respectively, by 202a, 202b and 204a and 204b.

Additionally, in the embodiment under consideration, the string of LEDs is connected only between the terminals 202a and 204a, while the terminals 202b and 204b are short-circuited by a return line formed by the ground GND.

Consequently, in the embodiment under consideration, the first connector 202 can be used to connect the lighting module 20 to the electronic converter 10, for example by connecting the contact 202a to the OUT+ terminal of the converter 10 and the contact 202b of the module 20 to the OUT− terminal of the converter 10.

Meanwhile, the second connector 204 can be used to connect a plurality of lighting modules in series. In particular, in this case, the connector 204 can be connected to the connector 202 of the next module, and the connector 204, that is to say the contacts 204a and 204b, of the last lighting module of the string would have to be short-circuited by a link or a resistor 30 to close the current loop.

In the embodiment shown in FIG. 3B, the electronic converter 10 is directly integrated into the lighting module 20; in other words, the power signal M is applied directly to the connector 202.

FIG. 3B also shows that the connector 204 is entirely optional, and the string of LEDs could also be connected directly between the OUT+ and OUT− terminals of the electronic converter 10, or the terminals 204a and 204b could already be short-circuited internally.

Therefore, in both of the embodiments shown in FIGS. 3A and 3B, the current loop must be closed manually when the lighting module is cut. In this context, the inventors have observed that the current loop can also be closed automatically.

Consequently, the lighting module 20 comprises not only the string of LEDs, but also connection means, such as electronic switches 206, configured to close the current loop automatically when the lighting module 20 has been cut.

Figure 4A:
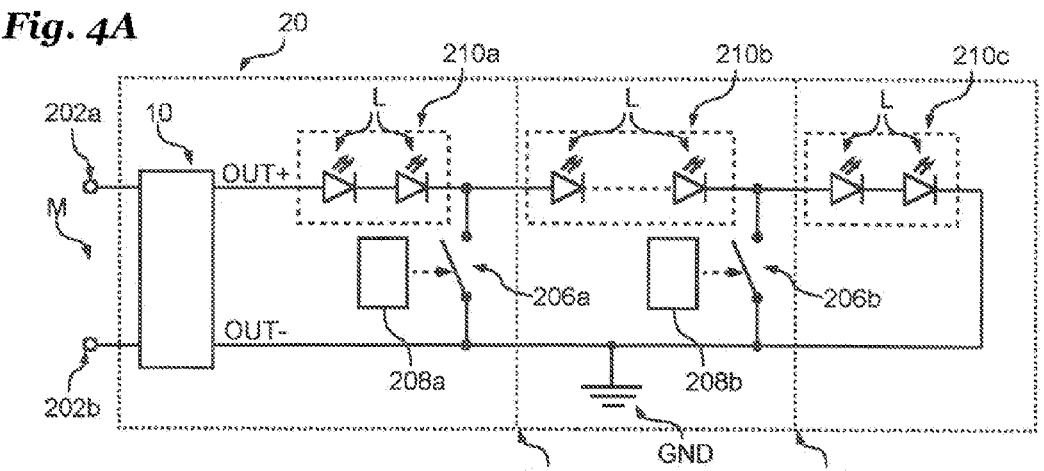
FIGS. 4A to 4C show various embodiments of lighting modules according to the present disclosure.

For example, FIG. 4A shows an embodiment of a lighting module 20 according to the present description. The circuit is substantially based on the embodiment of the lighting system according to FIG. 3B. However, persons skilled in the art will understand that the same teachings can also be applied to the system of FIG. 3A.

In particular, in the embodiment under consideration, the string of LEDs is divided into certain sets of LEDs 210, and the electronic switches 206 are configured to selectively connect the intermediate point between two respective sets of LEDs 210 to the ground GND, or to the OUT− terminal of the electronic converter 10.

As a general rule, electronic switches are sufficient where current driving is used. For voltage driving, however, each switch 206 should be coupled to a current limiter such as a resistor, configured to limit the current flowing through the electronic switch 206.

Additionally, each electronic switch 26 is associated with detection means 208 configured to detect the interruption of the string of LEDs. Thus, when the means 208 detect the interruption of the string of LEDs, the last electronic switch 206 upstream of the interruption is driven so as to close the current loop.

For example, in the embodiment under consideration, there are two segmentation points 200a and 200b, in other words three sets of light sources 210a, 210b and 210c. Consequently, in the embodiment under consideration, two switches 206a and 206b and two detection means 208a and 208b are provided.

Figure 4B:
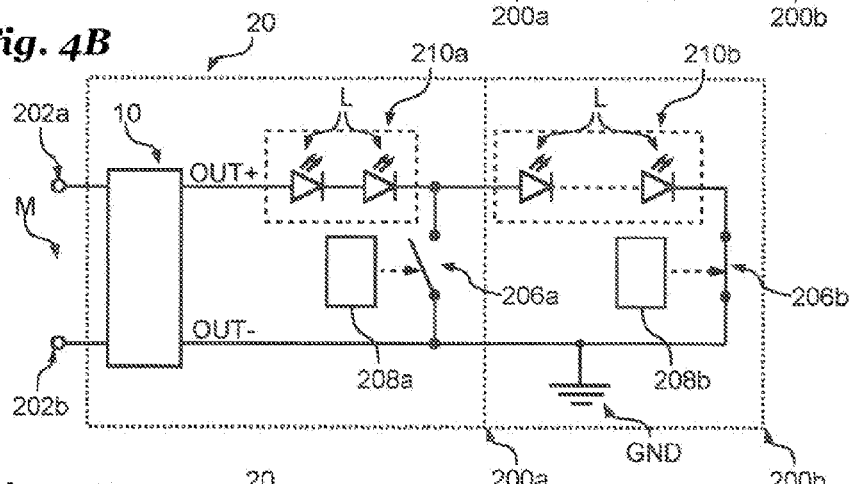
Figure 4C:
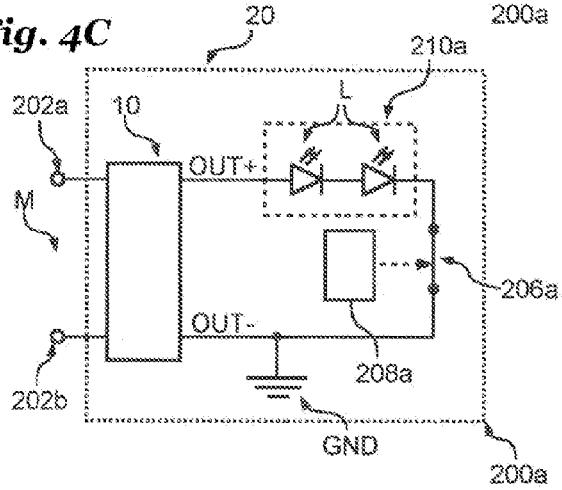

For example, FIG. 4B shows the case in which the lighting module has been cut at the segmentation point 200b, and FIG. 4C shows the case in which the lighting module 20 has been cut at the segmentation point 200a.

Figure 5A:
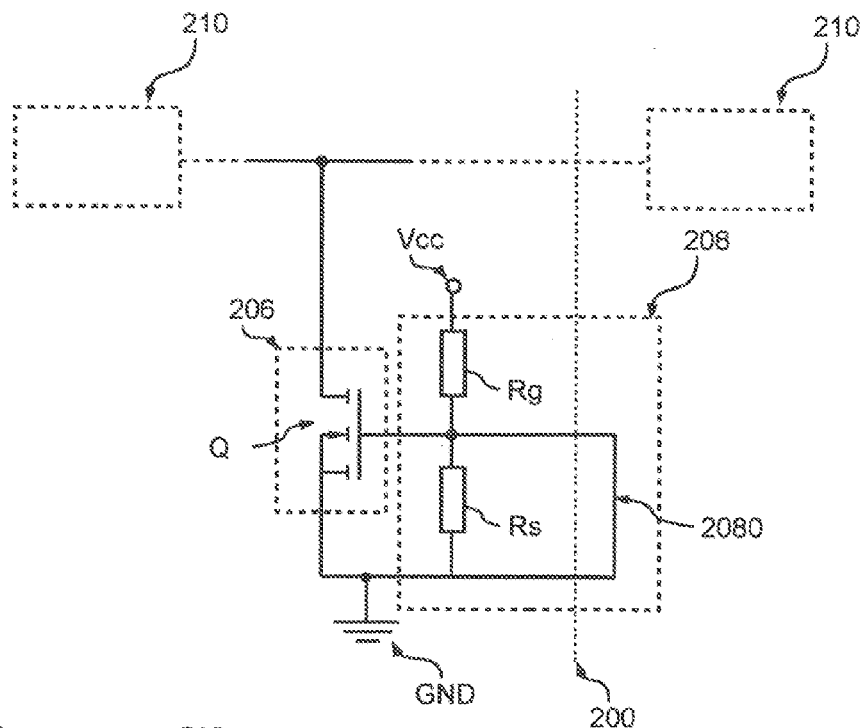
FIGS. 5A and 5B show various embodiments of lighting modules according to the present disclosure.
Figure 5B:
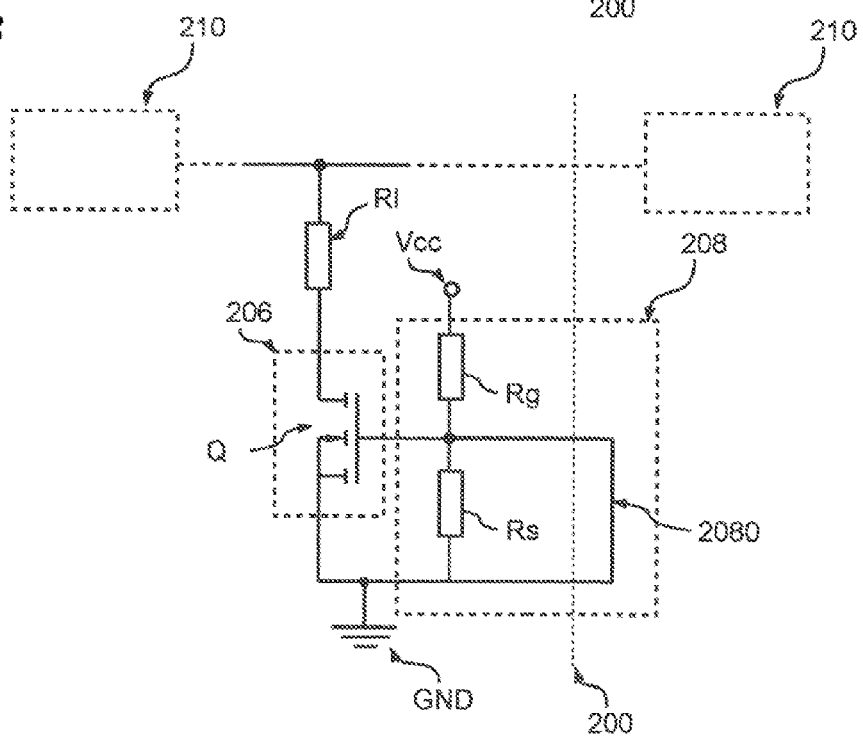

FIGS. 5A and 5B show possible embodiments of the electronic switch 206 and of the detection means 208. In particular, the embodiment shown in FIG. 5A can be used for current driving, while the embodiment shown in FIG. 5B can be used for voltage driving.

In the embodiments under consideration, the electronic switch is a metal-oxide-semiconductor field-effect transistor (MOSFET) Q, such as an N-MOS transistor. In this case, the drain is connected to the corresponding intermediate point between the sets of light sources 210, and the source is connected to the ground GND.

In particular, in the embodiment shown in FIG. 5A, the transistor Q, in other words the drain and source terminals, is connected directly between the corresponding intermediate point of the string and the ground GND. On the other hand, in the embodiment shown in FIG. 5B, in order to compensate for the absence of the other LEDs and limit the current flowing through the string of LEDs, a resistor RI is connected in series with the transistor Q, for example between the drain of the transistor Q and the corresponding intermediate point of the string, or between the source of the transistor Q and the ground GND. In both embodiments, the detection means 208 can be formed by a voltage divider comprising two resistors Rg and Rs connected in series and a link 2080 which short-circuits one of the resistors of the voltage divider.

In particular, in the embodiment under consideration, the voltage divider Rg, Rs is connected between a d.c. voltage Vcc and the ground GND, with the intermediate point of the voltage divider Rg, Rs connected to the gate of the transistor Q.

In various embodiments, the voltage Vcc is obtained from the power signal M. For example, if the power signal M is the 230 V a.c. mains voltage, the signal Vcc can be produced by means of a rectifier, such as a diode bridge rectifier, and a filter, such as a capacitor. For example, if the power supply 10 is integrated into the lighting module 20, this rectifier and filter are typically already present. As a general rule, it is also possible to use the power signal M directly, for example in the case in which the signal M is already a d.c. voltage. Additionally, the signal at the output of the electronic converter 10 can also be used. In this case, a small amount of current created by the electronic converter can be used to supply the voltage divider.

As mentioned previously, the voltage divider Rg, Rs is coupled to a link 2080 which short-circuits one of the resistors of the voltage divider. For example, if an N-MOS transistor is used, the link 2080 is connected in parallel to the resistor Rs. In various embodiments, this link 2080 is formed by a track on the printed circuit and extends beyond the corresponding segmentation point 200. Thus, when the lighting module 20 is cut at a certain segmentation point 200, the corresponding link 2080 is also interrupted.

Consequently, if an N-MOS transistor is used, the voltage at the gate of the transistor Q is normally low, because the resistor Rs is short-circuited, and the transistor Q is open. On the other hand, when the lighting module 20 is cut at a segmentation point 200, the link 2080 is interrupted, and consequently the voltage at the gate of the transistor Q rises and the transistor Q closes. The resistors Rs and Rg are therefore configured to ensure that, in this case, the voltage at the gate of the transistor Q is greater than the voltage threshold of the transistor Q.

In the embodiment under consideration, the detection means 208 and the electronic switch 206 are therefore configured in such a way that:
 a) when the link 2080 is intact, the transistor Q is open, and
 b) when the link 2080 is interrupted, the transistor Q is closed. Persons skilled in the art will understand that the detection means shown above can also be adapted to other types of transistor, such as P-MOS or bipolar transistors.

Figure 6:
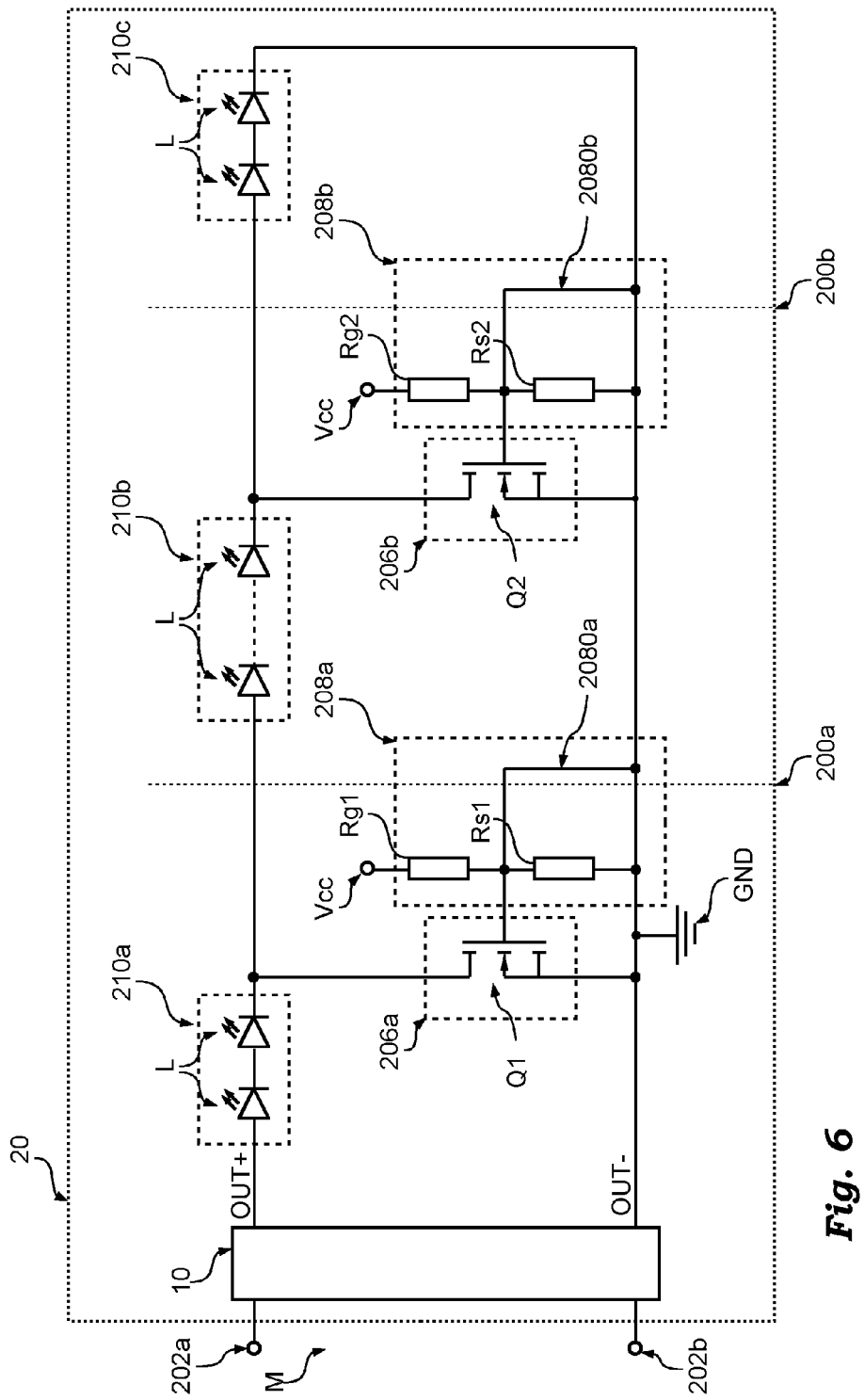
FIG. 6 shows various embodiments of lighting modules according to the present disclosure.

FIG. 6 shows a possible embodiment of the whole lighting module 20. This embodiment is substantially based on the lighting module of FIG. 4A, which comprises two segmentation points 200a and 200b.

For example, in the embodiment under consideration, current driving is used. As mentioned previously, however, the solutions described herein can also be applied to voltage driving. Therefore, two transistors Q1 and Q2 are provided in the embodiment under consideration. The first transistor Q1 is coupled to a first voltage divider comprising two resistors Rg1 and Rs1 and a first link 2080a, and the second transistor Q2 is coupled to a second voltage divider comprising two resistors Rg2 and Rs2 and a link 2080b.

Figure 7:
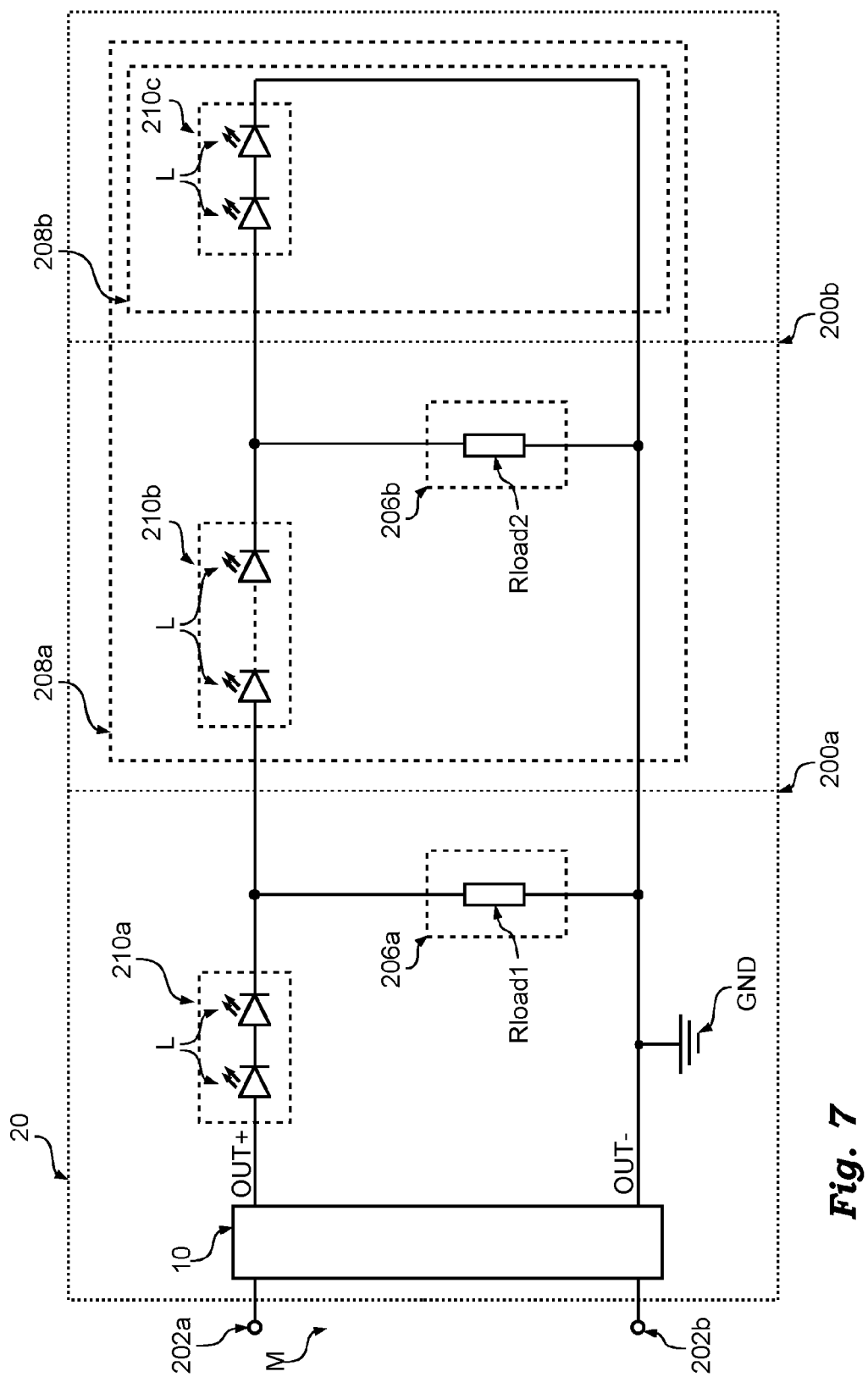
FIG. 7 shows various embodiments of lighting modules according to the present disclosure.

FIG. 7 shows a second embodiment which is less costly but also less efficient.

In particular, in the embodiment under consideration, the electronic switch 206 is replaced with a simple resistor and the detection means 208 are represented directly by the rest of the string of LEDs, in other words the portion of the string downstream of the segmentation point 200.

For example, two segmentation points 200a and 200b are shown in this case also, but the teaching provided herein can be applied to any number of segmentation points.

Consequently, in the embodiment under consideration, the lighting module 20 comprises two resistors Rload1 and Rload2.

In particular, at the segmentation point 200a, the detection means 208a are represented by the portion of the string of LEDs downstream of the segmentation point 200a, in other words the set of light sources 210b and 210c and the resistor Rload2. This portion of the string of LEDs can be represented by a resistance Req1.

In a substantially similar way, at the segmentation point 200b the detection means 208b are represented by the portion of the string of LEDs downstream of the segmentation point 200b, in other words the set of light sources 210c. This portion of the string of LEDs can also be represented by a resistance Req2.

In the embodiment under consideration, the value of the resistance Req1 is therefore greater than the value of the resistance Req2.

In one embodiment, the resistors Rload1 and Rload2 are designed in such a way that the values of the resistors Rload1 and Rload2 are greater than the value of the respective resistances Req1 and Req2.

Thus, when the segmentation point is intact, the current flows mainly through the downstream portion of the string. Conversely, when a segmentation point is interrupted, the current loop is closed and the current flows through the corresponding resistor Rload.

For example, these conditions are met when the resistors Rload1 and Rload2 have at least twice the resistance of the respective resistances Req1 and Req2, in other words when Rload1>×Req1 and Rload2>2×Req2. However, the values of the resistors Rload1 and Rload2 should not be too high, in order to prevent the resistors Rload1 and Rload2 from absorbing too much power and/or to ensure that the electronic converter 10 is used in the best conditions.

As a general rule, this embodiment can also be used with either voltage driving or current driving. In this case, however, the additional resistor's function of limiting the current flowing through the string of LEDs can be provided directly by means of the corresponding resistor Rload.

Consequently, the embodiments described above make use of connection means which allow the current to flow when the lighting module has been cut; in other words,
 a) when the lighting module has not been cut, the connection means cause the power supply current to flow mainly through the light sources, and
 b) when the lighting module has been cut, the connection means cause the power supply current to flow mainly through the light sources upstream of the interruption and the connection means. In the embodiments described previously, the connection means are formed by an electrically resistive element, for example a simple resistor or an electronic switch which represents a variable resistance.

In particular, if the module is intact, the resistive element has a resistance which is greater than the resistance of the portion of the module downstream of the corresponding segmentation point.

On the other hand, if the module is interrupted, the resistive element has a resistance which is less than the resistance of the portion of the module downstream of the corresponding segmentation point, which in this case is substantially infinite. In the embodiment shown in FIG. 7, this resistive element is a simple resistor Rload, and the function described above is provided by choosing a suitable value of resistance of the resistor.

On the other hand, in the embodiments shown in FIGS. 4A to 4C, 5A and 5B, and 6, the resistive element is an electronic switch, in other words an element having a variable resistance. In particular, this electronic switch 206 is coupled to a detection circuit 208 which drives the switch 206 in such a way that:

a) when the module is intact, the switch is open; in other words, the resistive element has a high resistance, and b) when the module is interrupted, the switch is closed and the resistive element has a low resistance.

Consequently, the solutions described herein have numerous advantages; for example, the lighting module can be cut at different segmentation points, and no manual operations are required in order to close the current loop, a lighting module and a cut lighting module can be used with the same electronic converter, and the solution can also be used for lighting modules which are sealed; in this case, it is only necessary to provide further protection for the cut part.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting module comprising:
    a power line for receiving a power supply current and a ground line,
    a segmentation point for cutting said lighting module into two parts,
    a first set of light sources upstream of said segmentation point, and
    at least a second set of light sources downstream of said segmentation point, wherein said second set of light sources is connected in series with said first set of light sources,
    wherein said lighting module comprises:
    a resistive element connected to the intermediate point between said first and said second set of light sources and said ground line, wherein said resistive element is configured in such a way that:
    when said lighting module has not been cut at said segmentation point, said resistive element has a resistance which is greater than the resistance of the portion of the lighting module downstream of said segmentation point, and
    when said lighting module has been cut at said segmentation point, said resistive element has a resistance which is less than the resistance of the portion of the lighting module downstream of said segmentation point.

2. The lighting module as claimed in claim 1, wherein said resistive element is a resistor, wherein the resistance of said resistor is greater than the resistance of the portion of the lighting module downstream of said segmentation point.

3. The lighting module as claimed in claim 1, wherein said resistive element is an element having a resistance adjustable between at least:
    a first condition wherein the resistance of said resistive element is greater than the resistance of the portion of the lighting module downstream of said segmentation point, and
    a second condition wherein the resistance of said resistive element is less than the resistance of the portion of the lighting module downstream of said segmentation point.

4. The lighting module as claimed in claim 3, wherein said resistive element is an electronic switch.

5. The lighting module as claimed in claim 4, wherein said resistive element is a transistor such as a MOSFET or bipolar transistor.

6. The lighting module as claimed in claim 3, comprising detection means configured for:
    detecting whether said lighting module has been cut at said segmentation point, and
    driving said resistive element in such a way that:
    when said lighting module has not been cut at said segmentation point, said resistive element is in said first condition, and
    when said lighting module has been cut at said segmentation point said resistive element is in said second condition.

7. The lighting module as claimed in claim 6, wherein said detection means comprise a voltage divider.

8. The lighting module as claimed in claim 6, wherein said detection means comprise a link which extends beyond said segmentation point and which is interrupted when said lighting module is cut at said segmentation point.

9. The lighting module according to claim 1, wherein said lighting module comprises a plurality of segmentation points, wherein each segmentation point is associated with a respective resistive element.

10. The lighting module according to claim 1, further comprising a linear or switching electronic converter.

* * * * *

UNITED STATES PATENT AND TRADEMARK OFFICE
CERTIFICATE OF CORRECTION

| | | |
|---|---|---|
| PATENT NO. | : 9,101,017 B2 | Page 1 of 1 |
| APPLICATION NO. | : 14/372220 | |
| DATED | : August 4, 2015 | |
| INVENTOR(S) | : Zanotto et al. | |

It is certified that error appears in the above-identified patent and that said Letters Patent is hereby corrected as shown below:

In the specification

Column 1, line 45: Insert --20-- between the words "module" and "at".

Column 4, line 38: Insert --20-- between the words "module" and "has".

Column 6, line 31: Insert --2-- between ">" and "XReq1".

Signed and Sealed this
Twenty-second Day of December, 2015

Michelle K. Lee
*Director of the United States Patent and Trademark Office*